(12) United States Patent
Hirama et al.

(10) Patent No.: US 6,917,134 B2
(45) Date of Patent: Jul. 12, 2005

(54) VEHICLE USE AC GENERATOR

(75) Inventors: Makoto Hirama, Hitachinaka (JP); Eiji Naito, Hitachinaka (JP); Sakae Ishida, Hitachinaka (JP); Susumu Sasaki, Naka-machi (JP); Kenichiro Matsubara, Chiyoda-machi (JP); Shinji Yamazaki, Hitachinaka (JP); Susumu Tajima, Hitachinaka (JP); Yoshiaki Honda, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/791,754

(22) Filed: Feb. 26, 2001

(65) Prior Publication Data

US 2001/0017500 A1 Aug. 30, 2001

(30) Foreign Application Priority Data

Feb. 25, 2000 (JP) ........................................ 2000-050033

(51) Int. Cl.⁷ ................................................. H07K 1/06
(52) U.S. Cl. ...................... 310/217; 310/216; 310/218; 310/254; 310/258; 310/259
(58) Field of Search ................................ 310/216–218, 310/254, 258, 259

(56) References Cited

U.S. PATENT DOCUMENTS 3,012,162 A * 12/1961 Rediger ...................... 310/259
3,787,744 A    1/1974 Saito
4,485,320 A   11/1984 Kawada
5,256,926 A * 10/1993 Hagenlocher ................ 310/259
5,554,902 A *  9/1996 Kessens ...................... 310/254
6,337,529 B1 * 1/2002 Higashino .................... 310/254

FOREIGN PATENT DOCUMENTS

| EP | 0793332   | 9/1997  |
|----|-----------|---------|
| FR | 2612703   | 9/1988  |
| JP | 56-12442  | 7/1954  |
| JP | 61-62537  | 4/1986  |
| JP | 61-123672 | 8/1986  |
| JP | 62-081945 | 4/1987  |
| JP | 3-169235  | 7/1991  |
| JP | 4-255437  | 9/1992  |
| JP | 4-372552  | 12/1992 |
| JP | 4-507186  | 12/1992 |
| JP | 05-003648 | 1/1993  |
| JP | 08-289491 | 11/1996 |

* cited by examiner

Primary Examiner—Thomas M. Dougherty
Assistant Examiner—Iraj A Mohandesi
(74) Attorney, Agent, or Firm—Crowell & Moring LLP

(57) ABSTRACT

To reduce noise, there is provided an alternator for motor vehicles having a rotor and a stator which is mounted between a pair of brackets. In the alternator a stator core forming the stator is made up of laminations of thin sheets. And at least a part of the thin sheets making up the stator core are split into four divisions or more in the circumferential direction; the thin sheets of each layer being laid with splits thereof arranged alternately in the circumferential direction.

12 Claims, 5 Drawing Sheets

VEHICLE USE AC GENERATOR

BACKGROUND OF THE INVENTION

The present invention relates to an alternator for motor vehicles and, more particularly, to an alternator for motor vehicles which has a stator core suitable for reducing a magnetic noise.

DESCRIPTION OF RELATED ART

There has been a more and more increasing need for an alternator for motor vehicles which can produce a higher output. There also has been a stringent requirement for noise reduction to meet a higher-class product-oriented end user's demand. A source of noise in conventional alternators for motor vehicles is a stator core for example. A magnetic vibration noise occurring in the stator core propagates directly to a bracket, coming out as a noise.

Because the conventional stator core is formed as a unitary structure, the magnetic vibration noise that has occurred in the stator core goes out without attenuation, presenting such a problem as a high noise level.

BRIEF SUMMARY OF THE INVENTION

It is, therefore, an object of this invention to provide an alternator for motor vehicles that can reduce the noise.

(1) To attain the above object, the alternator for motor vehicles according to this invention has a rotor and a stator held by a pair of brackets. A stator core forming the stator is an assembly of thin sheet laminations. In the alternator, at least a part of a plurality of thin sheets forming the stator core is circumferentially divided into four divisions or more and the splits of these laminations are arranged alternately in the circumferential direction. The resonance frequency can be lowered to decrease the noise by thus constituting the alternator.

(2) In the above description (1), thin sheets laminated are preferably securely fastened or welded, and the number of the joining points is the number of splits or a multiple of the number of splits.

(3) In the above description (2), the number of the joining points is preferably twice or three times or four times as great as the number of splits.

(4) In the above description (1), the number of splits of the split thin sheets is preferably four to eight splits.

(5) In the above description (4), the number of splits of the split thin sheets is preferably six splits.

(6) In the above description (1), the stator core is preferably an assembly of annular thin sheets in a joined portion between front and rear brackets.

(7) In the above description (6), the annular thin sheets are thicker than the above-described thin sheets divided.

DESCRIPTION OF THE PREFERRED EMBODIMENTS

The configuration of an alternator for motor vehicles according to one embodiment of this invention will be described with reference to FIG. 1 through FIG. 6.

First in FIG. 1, the general configuration of the alternator for motor vehicles used in the present embodiment will be explained.

Figure 1:
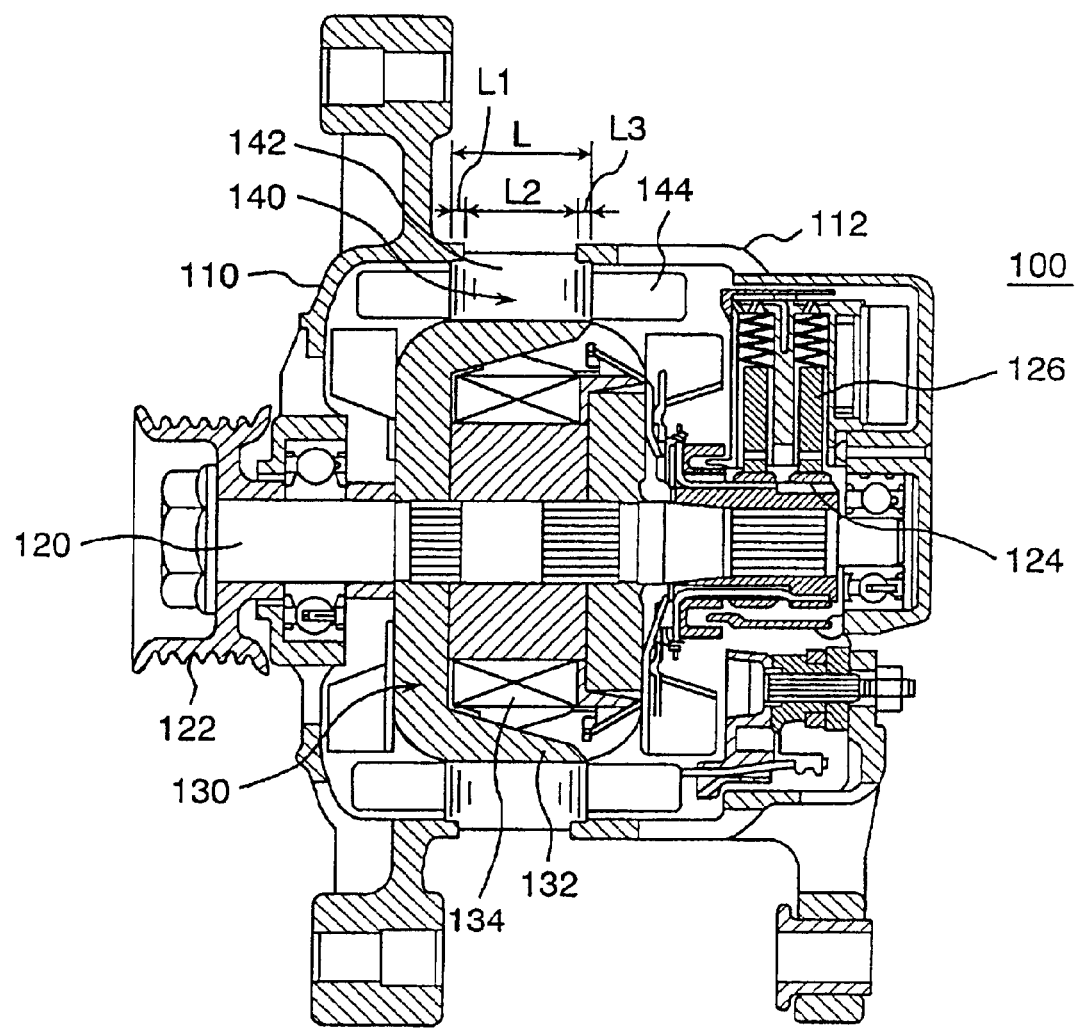
FIG. 1 is a longitudinal sectional view showing the general configuration of one embodiment of an alternator for motor vehicles according to the invention.

FIG. 1 is a longitudinal sectional view showing the general configuration of the alternator for motor vehicles according to one embodiment of this invention.

The alternator 100 for motor vehicles according to the present embodiment has two brackets including a front bracket 110 disposed on the pulley side and a rear bracket 112 located on the opposite side of the pulley. On the center of these brackets 110 and 112 is supported a shaft 120 through bearings. On one end of the shaft 120 a pulley 122 is mounted, and on the other end a slip ring 124 is mounted. The pulley 122 is connected to the output shaft of the engine through a belt, rotating in proportion to the speed of the engine. On the slip ring 124 is slidably attached a brush 126, through which the electric power is supplied to a later-described field coil.

At the midpoint of the shaft 120 a rotor 130 is mounted. The rotor 130 is provided on the outer periphery with a pair of pawl-shaped magnetic poles 132. At the center of the rotor a field coil 134 is wound, and the dc current is supplied from the slip ring 124 to the field coil 134, to thereby magnetize the pawl-shaped magnetic poles 132.

A stator 140 is securely attached between the front bracket 110 on the pulley side and the rear bracket 112 on the opposite side of the pulley. The stator 140 is comprised of a stator core 142 and a stator coil 144. In the slots of the stator core 142 the stator coil 144 is wound. When the pawl-shaped magnetic pole 132 is turned and magnetized by the rotation of the engine, a three-phase induced voltage is generated in the stator coil 144. The stator core 142 is an assembly of a plurality of thin-sheet laminations formed by stamping on a press, then is secured. For example, let the thickness L of the stator core 142 be 26 mm and the thickness of one sheet stator core be 0.5 mm, 52 thin sheets are laminated to make up the stator core. Both ends of the stator core 142 are fitted in the front bracket 110 on the pulley side and in the rear bracket 112 on the opposite side of the pulley respectively. Therefore, the fitting portions on both ends of the stator core 142 have a shape and dimensions which nearly agree with the inside diameter of the front bracket 110 on the pulley side and the rear bracket 112 on the opposite side of the pulley. Either of the sizes L1 and L3 of the fitting portions is 5 mm for example; and 10 laminated sheets are cut at the outside diameter to nearly the same shape and dimensions as the inside diameter of the front bracket 110 on the pulley side and the rear bracket 112 on the opposite side of the pulley.

In the alternator 100 for motor vehicles configured as described above, when the pulley 122 is driven by the engine, the shaft 120 rotates together with the slip ring 124 and the rotor 130, allowing the flow of the dc current from the brush 126 to the field coil 134 in the rotor. The field coil 134 works in such a manner that N and S poles will be formed at the pawl-shaped magnetic poles 132. The magnetic flux of the field coil 134 coming out from the pawl portion of the pawl-shaped N pole flows through the stator core 142 back to the pawl portion of the pawl-shaped S pole, thus forming a magnetic circuit. When the magnetic flux of this magnetic circuit crosses the stator coil 144, producing the three-phase induced voltage in the stator coil 144. The full-wave rectification of the three-phase induced voltage is performed by a diode, to convert the induced voltage into the dc voltage. The thus rectified dc voltage is regulated by an IC regulator, being held at a constant voltage of around 14.3V.

Next, by referring to FIG. 2, the configuration of the stator core of one lamination in the stator core 142 used in the alternator for motor vehicles according to the present embodiment will be explained.

Figure 2:
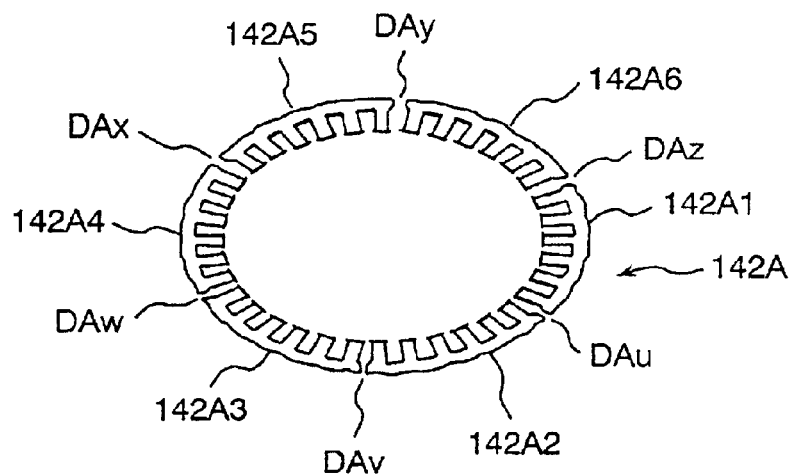
FIG. 2 is a perspective view showing the configuration of one lamination of the stator core used in one embodiment of the alternator for motor vehicles according to the invention.

FIG. 2 is a perspective view showing the configuration of the stator core of one lamination in the stator core used in the alternator for motor vehicles according to the present embodiment of this invention.

The stator core 142 is made up of a plurality of laminations which are formed of stamped thin sheets. FIG. 2 shows a stator core 142A of one lamination. In the present embodiment, the stator core 142A of one lamination is a ring-shaped stator core, which is made up of split stator core members 142A1, 142A2, 142A3, 142A4, 142A5 and 142A6, that is, six splits of the sections DAu, DAv, DAx, DAy and DAz divided in the circumferential direction. All the split stator core member 142A1 through 142A6 are of the same shape. Therefore, the original ring-shaped stator core 142A is formed by adjacently arranging the splits DAu, DAv, DAx, DAy and DAz as illustrated.

Next, by referring to FIG. 3, the configuration of the stator core 142 used in the alternator for motor vehicles according to the present embodiment will be described.

Figure 3:
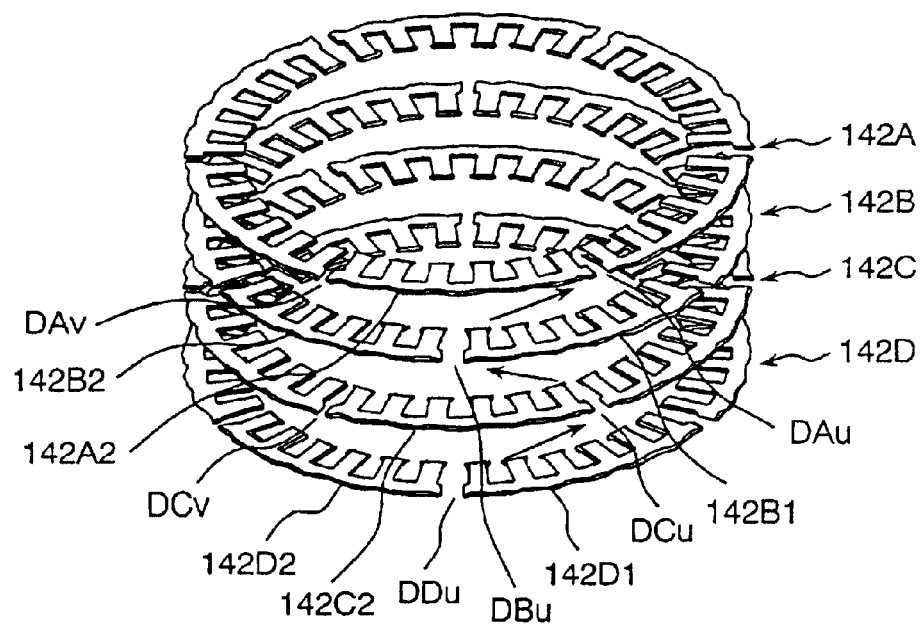
FIG. 3 is a perspective view showing the configuration of the stator core used in one embodiment of the alternator for motor vehicles according to the invention.

FIG. 3 is a perspective view showing the configuration of the stator core used in the alternator for motor vehicles according to one embodiment of this invention.

The stator core 142 of the present embodiment is formed by laminating one lamination of stator core 142A as shown in FIG. 2. That is, as shown in FIG. 3, the stator cores 142A, 142B, 142C and 142D of one lamination are laminated. The size and dimensions of the stator cores 142B, 142C and 142D are the same as those of the stator core 142A shown in FIG. 2. Usually the stator core 142 is formed of several tens of laminations. Here, however, a stator core of four laminations will be described for simplicity of explanation.

Furthermore, in the present embodiment, when the stator cores 142A, 142B, 142C and 142D are laminated and arranged, the splits are staggered (arranged alternately) by each lamination. That is, on both sides of the split stator core member 142A2 of the stator core 142A are located the splits DAu and DAv. Furthermore, a split DBu is located between the split stator core member 142B1 and the split stator core member 142B2 which form the stator core 142B of the second layer. The split DBu is positioned at the center in the circumferential direction of the split stator core member 142A2 of the stator core 142A of the first layer. That is, the split DBu of the stator core 142B of the second layer is set 30 degrees off in the clockwise direction from the split DAu of the stator core 142A of the first layer. Similarly, the split of the split stator core members which forms the stator core 142B of the second layer is also placed 30 degrees apart in the clockwise direction.

Next, the split stator core member 142C2 of the stator core 142C of the third layer has, on both sides, the splits DCu and DCv. The split DCu is positioned at the center in the circumferential direction of the split stator core member 142B1 of the stator core 142B of the second layer. That is, the split DCu of the stator core 142C of the third layer is arranged 30 degrees apart in the counterclockwise direction from the split DBu of the stator core 142B of the second layer. Similarly, the splits of the split stator core members forming the stator core 142C of the third layer are also placed 30 degrees apart in the counterclockwise direction.

Furthermore, between the split stator core member 142D1 and the split stator core member 142D2 which form the stator core 142D of the fourth layer, the split DDu is placed. The split DDu is placed at the center in the circumferential direction of the split stator core member 142C1 of the stator core 142C of the third layer. That is, the split DDu of the stator core 142D of the fourth layer is placed 30 degrees apart in the clockwise direction from the split DCu of the stator core 142C of the third layer. Similarly, the splits of the split stator core members forming the stator core 142D of the fourth layer are arranged 30 degrees apart in the clockwise direction.

As a result of the above-described arrangement, the splits DAu, DBu, DCu and DDu for example are mutually arranged in a clockwise and counterclockwise staggered manner. The split stator cores, being all of the same shape, can be arranged similarly staggered by shifting each layer only clockwise without shifting them clockwise, counterclockwise and clockwise.

Next, by referring to FIG. 4, the finished configuration of the stator cores used in the alternator for motor vehicles according to the present embodiment will be described.

Figure 4:
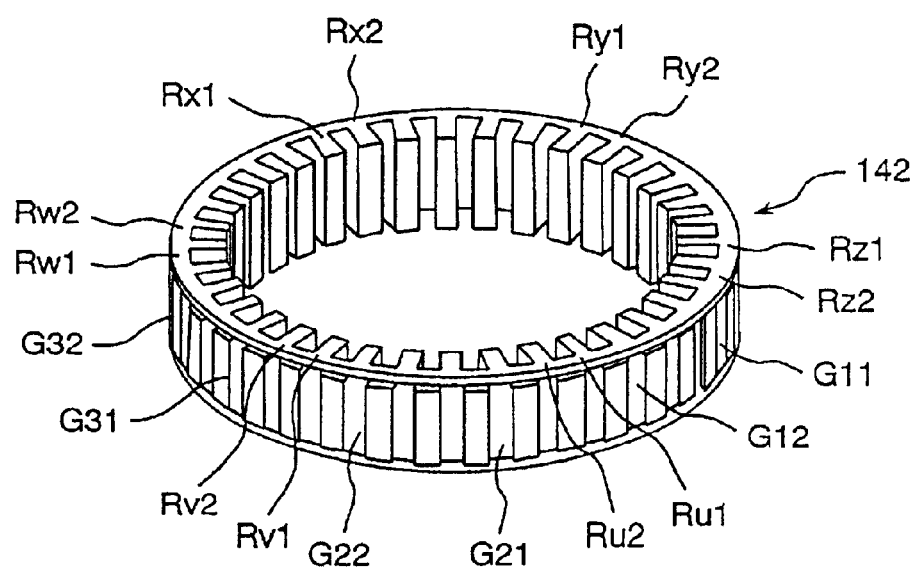
FIG. 4 is a perspective view showing a finished configuration of the stator core used in one embodiment of the alternator for motor vehicles according to the invention.

FIG. 4 is a perspective view showing the finished configuration of the stator core used in the alternator for motor vehicles according to one embodiment of this invention.

The split stator cores are staggered and laminated as shown in FIG. 3, and then the outer periphery of the stator cores are securely fastened by 12 rivets Ru1, Ru2, Rv1, Rv2, Rw1, Rw2, Rx1, Rx2, Ry1, Ry2, Rz1 and Rz2. Riveting positions for riveting by the rivets Ru1, . . . , Rz2 stated above are on both sides of the splits DAu, . . . , DAz of the split stator core 142A of the uppermost layer. That is, the rivets Ru1 and Ru2 are positioned on both sides of the split DAu of the split stator core 142A shown in FIG. 2. Riveting positions of other rivets Rv1, . . . , Rz2 are also similarly positioned on both sides of the splits DAv, . . . , DAz of the split stator core 142A of the uppermost layer.

Next, by referring to FIG. 5, a result of measurements of a transfer function of the alternator for motor vehicles according to the present embodiment will be explained.

Figure 5:
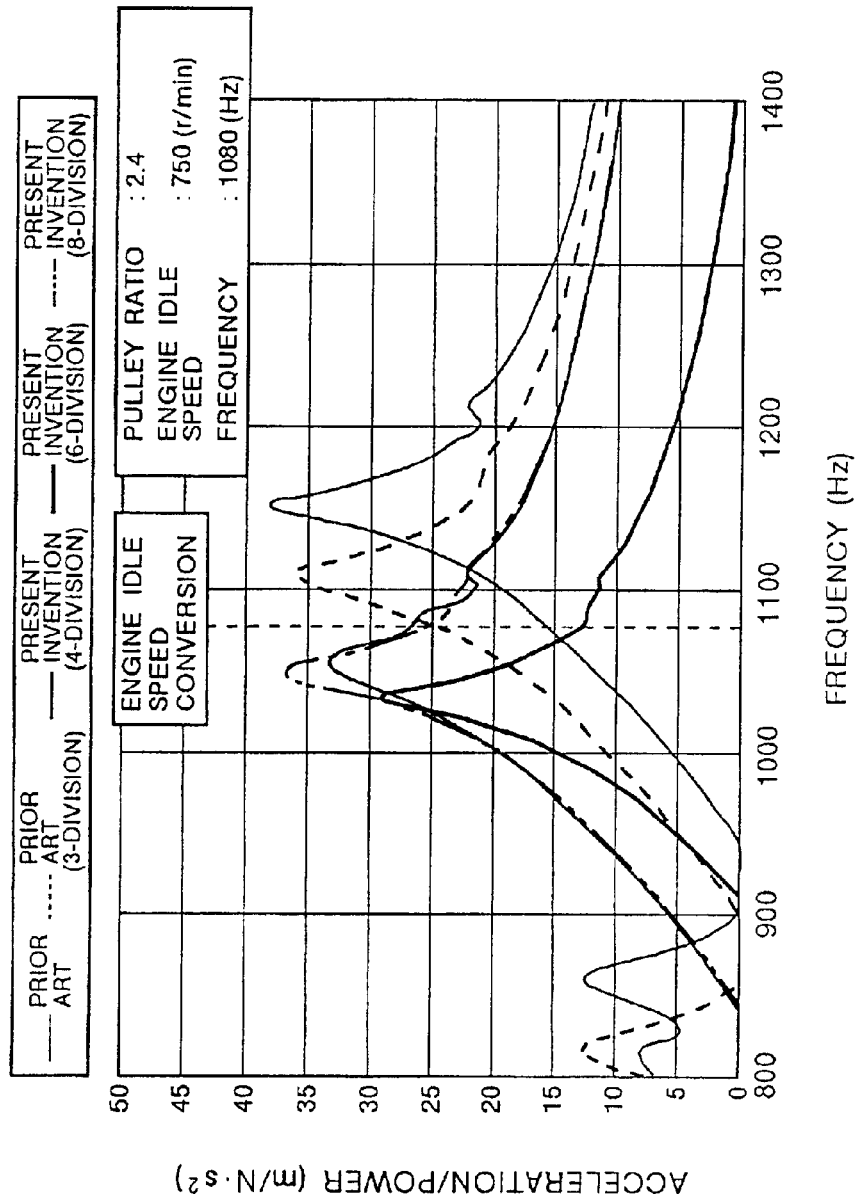
FIG. 5 gives characteristics curves showing a result of measurements of a transfer function of one embodiment of the alternator for motor vehicles according to the invention.

FIG. 5 is a characteristics chart showing results of measurements of a transfer function of the alternator for motor vehicles according to one embodiment of this invention.

In FIG. 5, the frequency (Hz) is shown on the horizontal axis, while the acceleration/power (m/H·S$^2$) is given on the vertical axis. In the transfer function shown in the chart, a thin solid line indicates the transfer function of the alternator for motor vehicles which uses a conventional non-division stator core, and a broken line indicates the transfer function of the alternator for motor vehicles which uses a conventional 3-division stator core. A medium-thickness solid line indicates a transfer function of the alternator for motor vehicles which uses a 4-division stator core of the present embodiment. A thick solid line indicates a transfer function of the alternator for motor vehicles which uses a 6-division stator core. And a two-dot chain line indicates a transfer function of the alternator for motor vehicles which uses an 8-division stator ore of the present embodiment. The 4- and 8-division stator cores are stator cores split into four and eight divisions in relation to the 6-division stator core shown in FIG. 2.

In the present embodiment, firstly, the resonance frequency of the alternator (4-division (medium-thickness solid line), 6-division (thick solid line), and 8-division (two-dot chain line)) of the alternator of the present embodiment is low as compared with a conventional alternator (non-division (thin solid line) and three-division (broken line)). In the alternator of the present embodiment, the resonance frequency is lower than the frequency (1080 Hz) at an engine idle speed. Generally, the engine, when operating, is rotating at the idle speed or higher. Therefore, when the resonance frequency is higher than the frequency (1080 Hz) at the engine idle speed like in a conventional alternator, the engine speed will correspond to the resonance frequency of the alternator, producing a great noise. On the other hand, in the case of the present embodiment, since the resonance frequency is lower than the frequency (1080 Hz) at the engine idle speed, the engine speed will not correspond to the resonance frequency of the alternator during engine operation, thereby restraining noise occurrence.

Secondly, in the present embodiment, it is possible to decrease the peak value of acceleration/power at the resonance frequency. The peak value of acceleration/power, which affects the volume of noise which will occur, can be decreased in the present embodiment, thereby further reducing the noise.

Increasing the number of divisions decreases the resonance frequency, the attenuation of which, therefore, can be expected. The increase in the number of divisions, however, will contrarily increase the number of joining points of the stator core, which will increase in rigidity, resulting in a decrease in the attenuation effect. For attenuation the 6-division structure is most effective. The adoption of the 6-division structure can lower the resonance frequency to the lowest level and also decrease the acceleration/power peak value most. Next effective is the 4-division structure. The use of the 4-division structure can reduce the resonance frequency lower than conventional one. Furthermore, when the 8-division structure is adopted, the acceleration/power peak value is about the same as in the conventional 3-division structure, and therefore the resonance frequency can be lowered more than the conventional one, showing a noise reduction effect.

Resonance can be prevented by increasing the stator core joining points to 12. The effective number of joining points is 12, 18 or 24 in the case of the 6-division structure.

Next, by referring to FIG. 6, a result of measurements of the magnetic noise of the alternator for motor vehicles according to the present embodiment will be explained.

Figure 6:
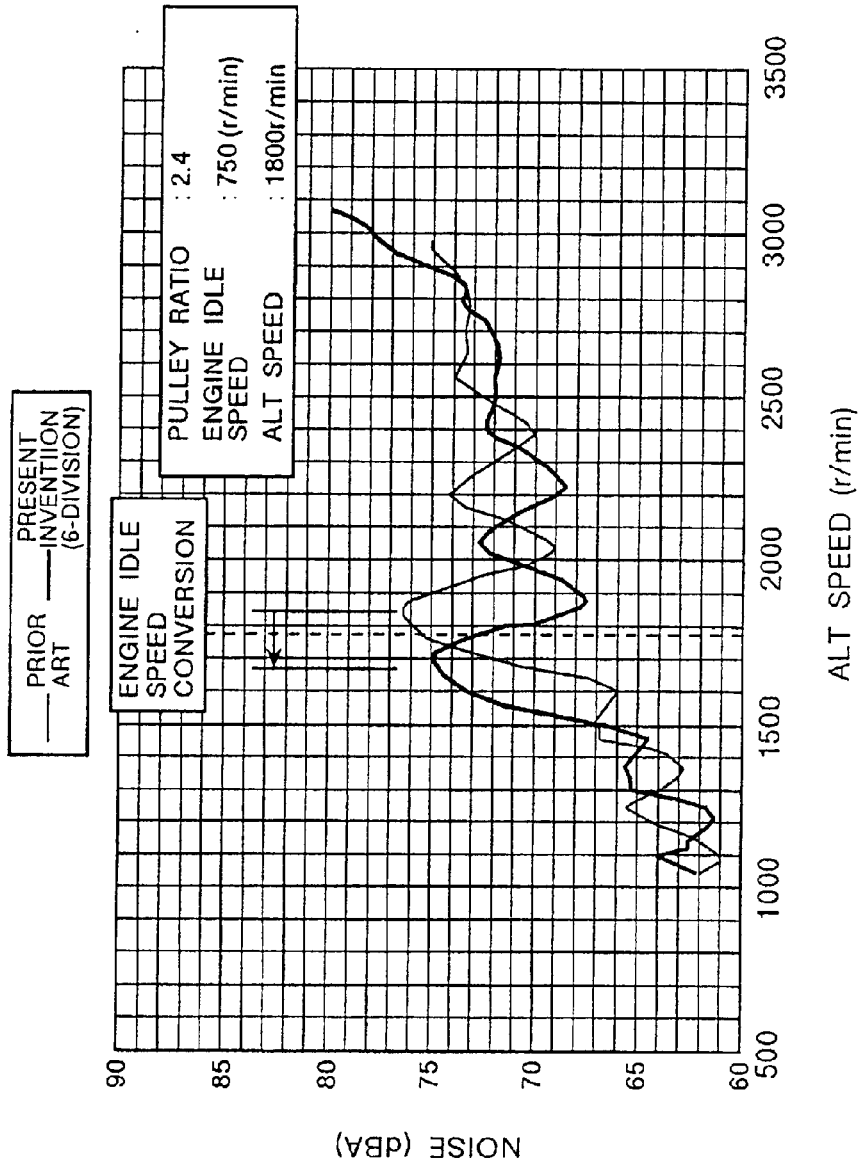
FIG. 6 gives characteristics curves showing a result of measurements of magnetic noise of one embodiment of the alternator for motor vehicles according to the invention.

FIG. 6 is a characteristics chart showing the result of measurements of the magnetic noise of the alternator for motor vehicles according to one embodiment of this invention.

The frequency f (Hz) and the speed N (rpm) of the alternator for motor vehicles can be given by the following equation.

$$f=(N/60)\times n$$

where n represents the order (36 order) of the speed of the alternator for motor vehicles.

The speed related to the noise problem is in the vicinity of the engine idle speed (generally, when the idle speed is 750 rpm, and the pulley ratio is 2.4, the converted speed N of the alternator for motor vehicles will be 1800 rpm). From the equation given above, the frequency f will be 1080 Hz. If the frequency is closely analogous to, or in agreement with, the natural frequency of the alternator for motor vehicles, there will occur a magnetic resonance, resulting in an increased noise.

In FIG. 6, the speed N (rpm) of the alternator for motor vehicles is given on the horizontal axis, while the noise (dBA) is given on the vertical axis. A thin solid line indicates a noise occurring when a conventional non-division stator core is used. At around the converted engine idle speed of 1800 rpm, the magnetic resonance is taking place, producing a great noise. A thick solid line indicates a noise occurring when a 6-division stator core of the present embodiment is used. In FIG. 5, as explained above, because the 6-division stator core of the present embodiment is used, the natural frequency moves to the low-frequency side; accordingly the natural frequency and resonance frequency of the alternator for motor vehicles are mutually shifted, the noise can be reduced. Furthermore, an overall value also can be decreased by the attenuation effect.

A plurality of split stator cores laminated can be fastened not only by riveting or bolting but by welding.

In the above-described example, the stator core was fastened at both sides of the split portion, and therefore it should be understood that the stator core is fastened at twice as many points as the number of divisions, but is not limited thereto, and may be fastened at just the number of divisions, or at four or eight times as many points as the number of divisions. However, if the stator core is fastened at too little number of points, there will occur a clearance between thin sheets of the laminated split stator core. The clearance between the thin sheets increases a leakage magnetic flux, resulting in a lowered alternator efficiency. It is, therefore, undesirable to decrease the number of joining points, and is desirable to provide twice or over as large the number of divisions. If the number of joining points is increased, the stator core will increase in rigidity; therefore, using the split stator core will lower the vibration attenuation effect. The number of joining points is preferably eight times or less as large as the number of divisions.

For laminating and fastening the stator core both riveting and welding may adopted together. For example, in the configuration shown in FIG. 4, the stator core is fastened by 12 rivets Ru1, . . . , Rz2 and further by welding at 12 points of the grooves G11, G12, G21, G22, G31, G32, . . . formed in the outer periphery of the laminated stator core 142. Here, the grooves G11 and G12 are formed inside of the rivets Ru2 and Rv1 in the direction of the outer periphery, and the grooves G21 and G22 are formed inside of the rivets Ru2 and Rv1 in the direction of the outer periphery, and furthermore the grooves G31 and G32 are formed inside of the rivets Rv2 and Rw1 in the direction of the outer periphery. That is, the stator core is fastened at 24 points in all (four times as many as the number of divisions).

In the description made by referring to FIG. 3 or FIG. 4, all the thin-sheet stator core members forming the stator core 142 are of a split structure. It, however, should be noticed that the stator core 142 may be of a split structure only partly. For example, on either end of the stator core 142 is provided a fitting portion as shown in FIG. 1. In the fitting portion an annular thin sheet like in a conventional one is used; and at the central part a thin sheet stator core of split structure as shown in FIG. 2 may be used. In this case, the central part for example is made of the thin sheets of split structure shown in FIG. 2, in which 32 thin sheets each measuring 0.5 mm in thickness are arranged in a staggered manner. At both ends, a laminated product of 52 thin sheets in total is formed of laminates each including 10 annular thin sheets each measuring 0.5 mm thick, then joined into one body by fastening or welding. Since both ends of the stator core are formed of the annular thin sheets, the stator core can be enhanced in rigidity. The attenuation effect and rigidity at the joined portion, therefore, can be enhanced by doubling or trebling the number of divisions of the stator core. Here, the annular thin sheets at both ends have been pre-stamped to the outside shape and dimensions which fit to the bracket; therefore no cutting of the stator core for forming the fitting portion is needed, thus improving a fabrication efficiency. Furthermore the laminates at both ends may be formed for example by assembling five annular sheets each measuring 1.0 mm in thickness, to the same thickness stated above, thereby enabling to increase the rigidity of the stator core.

According to the present embodiment, as explained above, the stator core of the alternator for motor vehicles is of a multi-split type, which allows shifting the natural frequency, which is a factor of the magnetic noise, to the lower side and also decreasing the peak speed (resonance frequency) of noise to lower than the engine idle speed range. Also it is possible to reduce the noise by the vibration damping effect.

This invention, therefore, has an advantage in reducing a noise occurring in the alternator for motor vehicles.

What is claimed is:

1. An alternator for motor vehicles having a rotor and a stator which is mounted between a pair of brackets, in which a stator core forming said stator is made up of laminations of a plurality of thin sheets, wherein at least a part of said plurality of thin sheets which make up said stator core are split into four divisions or more in the circumferential direction; said thin sheets of each layer being laid with splits thereof arranged alternately in the circumferential direction, the both ends of said stator core are fitted in the front bracket and the rear bracket; the fitting portions of both ends of said stator core are configured by layering non-split annular thin sheets.

2. An alternator for motor vehicles according to claim 1, said laminations of thin sheets are fastened or welded at joining points, and the number of said joining points is the same as, or a multiple of, the number of said divisions.

3. An alternator for motor vehicles according to claim 2, the number of said joining points is two or three or four times as large as the number of said divisions.

4. An alternator for motor vehicles according to claim 1, wherein the number of divisions of said thin sheets is four to eight divisions.

5. An alternator for motor vehicles according to claim 4, the number of divisions of said thin sheets is six divisions.

6. An alternator for motor vehicles according to claim 1, wherein said non-split annular thin sheets of the both ends of said stator core are cut at the outside diameter to substantially the same shape and dimensions as the inside diameter of said front bracket and rear bracket.

7. An alternator for motor vehicles having a rotor and a stator which is mounted between a pair of brackets, in which a stator core forming said stator is made up of laminations of a plurality of thin sheets, wherein at least a part of said plurality of thin sheets which make up said stator core are split into four divisions or more in the circumferential direction; said thin sheets of each layer being laid with splits thereof arranged alternately in the circumferential direction, the both ends of said stator core are configured by layering non-split annular thin sheets; said non-split annular thin sheets are thicker than said split sheets.

8. An alternator for motor vehicles according to claim 7, said laminations of thin sheets are fastened or welded at joining points, and the number of said joining points is the same as, or a multiple of, the number of said divisions.

9. An alternator for motor vehicles according to claim 8, the number of said joining points is two or three or four times as large as the number of said divisions.

10. An alternator for motor vehicles according to claim 7, the number of divisions of said thin sheets is four to eight divisions.

11. An alternator for motor vehicles according to claim 10, the number of divisions of said thin sheets is six divisions.

12. An alternator for motor vehicles according to claim 7, wherein said non-split annular thin sheets of the both ends of said stator core are cut at the outside diameter to substantially the same shape and dimensions as the inside diameter of said front bracket and rear bracket.

* * * * *